United States Patent [19]

Miyake et al.

[11] Patent Number: 5,722,700
[45] Date of Patent: Mar. 3, 1998

[54] COUPLING STRUCTURE FOR PIPES OF SYNTHETIC RESIN

[75] Inventors: Tetsuya Miyake; Yoshihiro Akiyama, both of Wako, Japan

[73] Assignee: Honda Giken Kogyo Kabushiki Kaisha, Tokyo, Japan

[21] Appl. No.: 522,719

[22] Filed: Sep. 1, 1995

[30] Foreign Application Priority Data

| Sep. 8, 1994 | [JP] | Japan | 6-214822 |
| May 19, 1995 | [JP] | Japan | 7-121250 |

[51] Int. Cl.$^6$ ............................................. F16L 41/08
[52] U.S. Cl. .................... 285/192; 285/382; 285/423; 285/399; 285/328
[58] Field of Search ............................. 285/423, 382, 285/399, 260, 29, 84, 328, 382.1, 382.2, 192, 189

[56] References Cited

U.S. PATENT DOCUMENTS

| 2,500,720 | 3/1950 | Van Der Heen | 285/328 |
| 3,380,765 | 4/1968 | Himmel | 285/331 |
| 3,781,941 | 1/1974 | MacFarland | 285/328 |
| 4,093,280 | 6/1978 | Yoshizawa et al. | 285/328 X |
| 4,126,338 | 11/1978 | Coel et al. | 285/423 X |
| 4,404,983 | 9/1983 | Scheurenbrand et al. | 285/423 X |
| 4,523,780 | 6/1985 | Cheer | 285/399 |

FOREIGN PATENT DOCUMENTS

| 143 062 | 5/1985 | European Pat. Off. . | |
| 2.157.651 | 6/1973 | France . | |
| 201 373 | 12/1958 | Germany . | |
| 37 28 886 | 3/1989 | Germany . | |
| 43 15534 A1 | 12/1993 | Germany . | |
| 994 294 | 2/1965 | United Kingdom . | |
| 1356393 | 6/1974 | United Kingdom | 285/328 |

*Primary Examiner*—Randolph A. Reese
*Assistant Examiner*—Heather Shackelford
*Attorney, Agent, or Firm*—Armstrong, Westerman, Hattori, McLeland & Naughton

[57] ABSTRACT

A first pipe is press-fitted into a second pipe having an inner peripheral surface, circular in section, about an axis of the second pipe. The first pipe, having an outer peripheral surface provided with recesses each located between arcuate portions, and which recesses have the same radius about an axis of the first pipe and are located at a plurality of circumferentially spaced-apart points. The recesses are each located radially inwardly of a phantom circumferential extension of the arcuate portions to extend axially over a predetermined length of the first pipe. Thus, it is possible to relatively enlarge the press-fit margin leading to an elongation limit and to set the dimensional accuracy of the pipe product at a relatively low value by the fact that when the first pipe is press-fitted into the second pipe, the second pipe flows so as to fill a gap produced between the first and second pipes due to the plurality of recesses provided on the outer peripheral surface of the first pipe, as well as by the fact that the first pipe is easy to deform under compression at the recesses.

5 Claims, 6 Drawing Sheets

COUPLING STRUCTURE FOR PIPES OF SYNTHETIC RESIN

BACKGROUND OF THE INVENTION

1. Field of the Invention

The present invention relates to a synthetic resin pipe coupling structure for coupling a first pipe made of synthetic resin to a second pipe made of a synthetic resin.

2. Description of the Prior Art

A coupling structure for two pipes made of a synthetic resin is conventionally known and disclosed, for example, in Japanese Utility Model Application Laid-open No. 103254/92. In this coupling structure, a plurality of inclined portions are provided on an outer surface of the first pipe to engage a plurality of hook portions provided on an inner surface of the second pipe at one end thereof. The first pipe is inserted into the second pipe in a manner that the inclined portions engage the corresponding hook portions, respectively, and a rubber packing is interposed between the first and second pipes.

The known coupling structure is of a type in which the hook portions of the second pipe are brought into engagement with the inclined portions of the first pipe with the rubber packing interposed between the first and second pipes. However, a sealing member, such as the packing for achieving the sealing between both the pipes, is required, not only resulting in an increased number of parts or components, but also, when the coupling structure is applied, for example, to parts mounted in a vehicle, it is difficult to maintain a stable coupling strength between both the pipes during traveling of the vehicle.

A press-fitting structure is simply conceived as a structure for coupling two pipes stably, with the passage of time, without the use of an extra part, such as a damper stay, a welding, a caulking and the like, even when the structure is mounted in the vehicle. However, when both the pipes are made of a synthetic resin, if a press-fit margin is not suitable, there is a possibility that the pipe may elongate whereby the press-fitting, to exceed an elongation limit, and to inhibit the variability in dimensional accuracy of a product and set the press-fit margin at a suitable value, the productivity of the pipe is reduced.

SUMMARY OF THE INVENTION

Accordingly, it is an object of the present invention to provide a coupling structure for pipes formed of a synthetic resin, in which increases in numbers of parts, and processing steps, can be avoided and which is capable of insuring an inexpensive coupling with a durability and stability, producing no chattering, wherein the reduction in productivity of the pipes, caused in the employment of the press-fitting and coupling, can be prevented.

To achieve the above object, according to an aspect and feature of the present invention, there is provided a synthetic resin pipe coupling structure, for coupling a first pipe of a synthetic resin to a second pipe of a synthetic resin, wherein the first pipe is press-fitted into the second pipe, having an inner peripheral surface which is circular in section about an axis of the second pipe, the first pipe having an outer peripheral surface provided with recesses, each located between arcuate portions, which are formed into an arcuate shape with the same radius about an axis of the first pipe at a plurality of circumferentially spaced-apart locations, the recesses being located radially inwardly of phantom extensions of the arcuate portions, to extend axially over a predetermined length.

With the above features of the present invention, it is possible to relatively enlarge the press-fit margin, leading to an elongation limit, and to set the dimensional accuracy of the pipe product at a relatively low value by the fact that, when the first pipe is press-fitted into the second pipe, the second pipe flows so as to fill a gap produced between the first and second pipes, due to the plurality of recesses provided on the outer peripheral surface of the first pipe, as well as by the fact that the first pipe is easy to deform under compression at the recesses.

According to another aspect and feature of the present invention, a purifying-air exit pipe, connected to a case of a synthetic resin for an air cleaner for an internal combustion engine, comprises a second pipe integrally provided on the case to protrude outwardly, and a first pipe, press-fitted into, and connected to, the second pipe the first pipe comprising a press-fitted cylindrical portion which is provided at its outer peripheral surface with recesses, having a length substantially corresponding to the axial length of the second pipe and which is press-fitted into the second pipe, and a protrusion-in cylindrical portion, which is integrally connected to the press-fitted cylindrical portion and which is protruded into the case.

With the above feature of the present invention, it is possible to provide a resonance effect by coupling the pipes and inserting the protrusion-in cylindrical portion into the case, while maintaining the coupling stability without the need for an extra retaining/fixing member, a welding, a caulking, and the like, on the side of an outlet of an air cleaner requiring a vibration resistance, a wear resistance and a firm retainability.

According to a further aspect and feature of the present invention, a stopper is provided in an inner surface of the case and having a stopper surface facing forwardly in a direction of press-fitting the first pipe into the second pipe, and a locking portion, projectingly provided on an outer surface of the protrusion-in cylindrical portion of the first pipe, and which is adapted to move past the stopper to provide a shoulder opposing the stopper surface when the first pipe is press-fitted into the second pipe.

With the above feature of the present invention, the slip-out of the first pipe from the second pipe can be reliably inhibited.

The above and other objects, features and advantages of the invention will become apparent from the following description of a preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
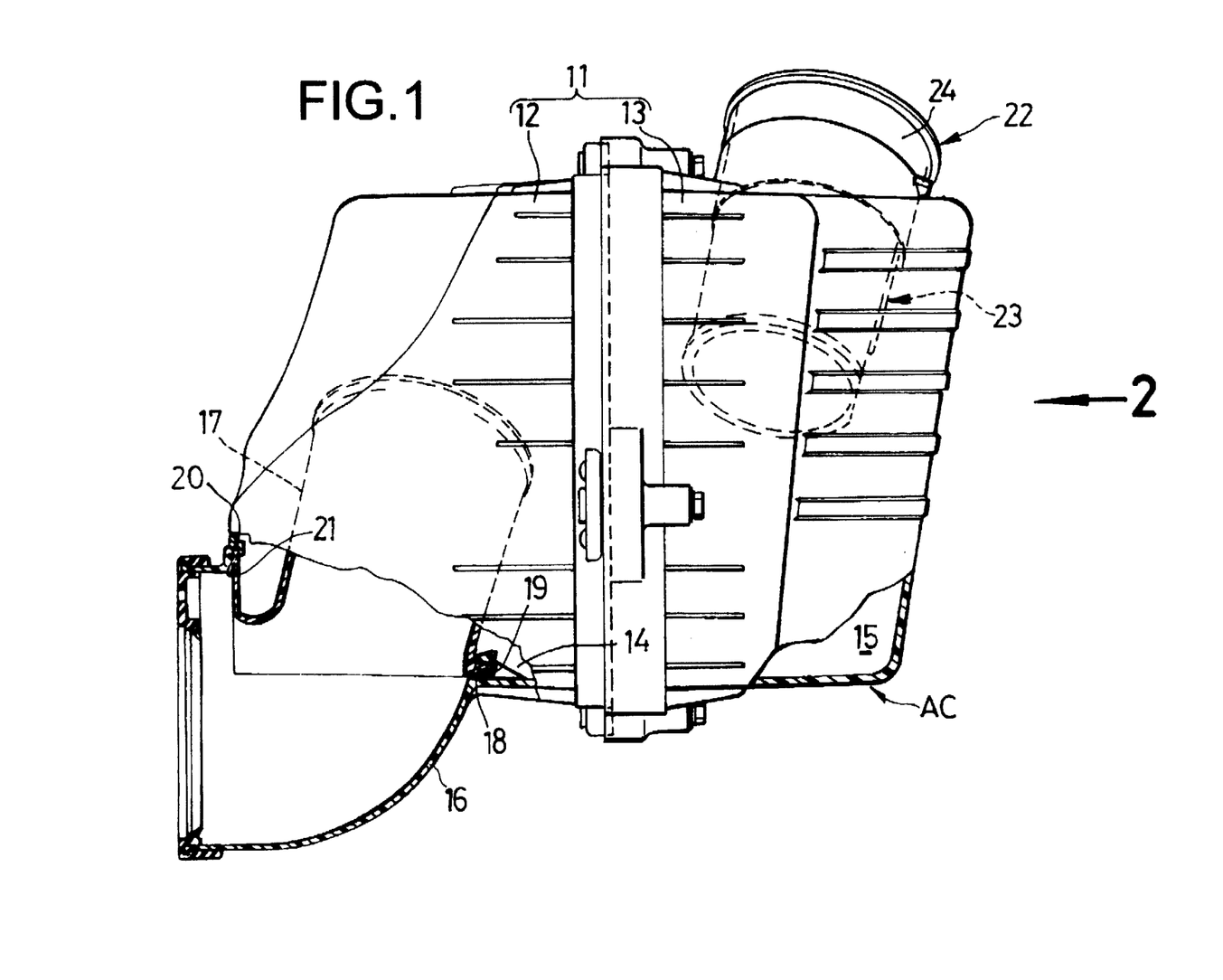
FIG. 1 is plan view of an air cleaner for an internal combustion engine, to which an embodiment of the present invention is applied.
Figure 2:
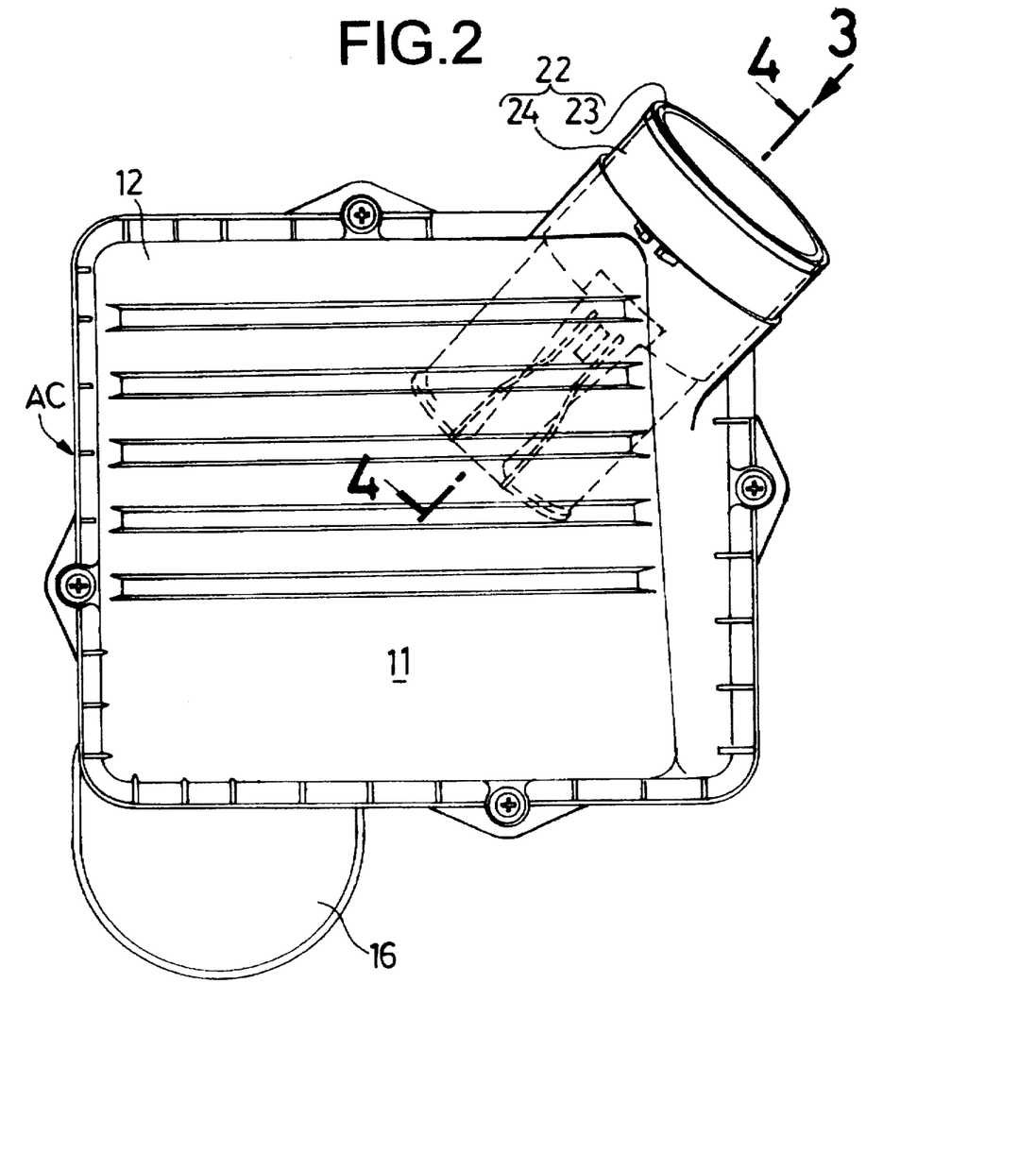
FIG. 2 is a view taken along an arrow 2 in FIG. 1.

Referring first to FIGS. 1 and 2, a case 11 of an air cleaner AC for an internal combustion engine is comprised of a first case half 12 and a second case half 13 which are coupled to each other in a manner that opening ends of the case halves 12 and 13 are fitted to each other. A cleaner element (which is not shown) is accommodated in the case 11 in a manner that it is clamped between the case halves 12 and 13. The inside of the case 11 is divided into two portions: an unpurified our inlet chamber 14 within the first case half 12, and a purified air outlet chamber 15 within the second case half 13.

The case halves 12 and 13 are formed by an injection molding of a reinforcing material-filled thermoplastic synthetic resin. The thermoplastic synthetic resin is used in consideration of an easy molding in the injection molding. For the purpose of enhancing the strength and the creep resistance at a high temperature, a reinforcing material, such as fiber, talc or mineral, is added into the thermoplastic synthetic resin.

The first case half 12 is integrally provided with an intake pipe 16 for introducing air into the chamber 14. A protrusion pipe 17 is connected to the intake pipe 16 and protrudes into the chamber 14. An outer end of the protrusion pipe 17 is connected to an internal wall of the first case half 12. The protrusion pipe 17 is formed from the same reinforcing material-filled thermoplastic synthetic resin as that for the first case half 12. It is unnecessary to make allowance particularly for the bonding rigidity of a connection between the intake pipe 16 and the protrusion pipe 17 and hence, the outer end of the protrusion pipe 17 is connected to the first case half 12 in a simple connecting structure. More specifically, an engage pin 18, projectingly provided at the outer end of the protrusion pipe 17, is fitted and locked into a locking hole 19, provided in the first case half 12, and an engage projection 20, provided at the outer end of the protrusion pipe 17, on the opposite side from the engage pin 18, is fitted and locked into a locking recess 21 provided in the first case half 12.

Because the protrusion pipe 17 connected to the intake pipe 16 protrudes into the chamber 14, a portion of the protrusion pipe 17 is surrounded by the first case half 12 within the chamber 14. This area exhibits a resonance effect, thereby making it possible to provide reductions in vibration of the air cleaner AC and in noise in an intake system, particularly without provision of a resonance chamber.

A purified-air exit pipe 22 leading to the purifying chamber 15 is connected to the second case half 13 in the case 11 of the air cleaner AC.

Figure 3:
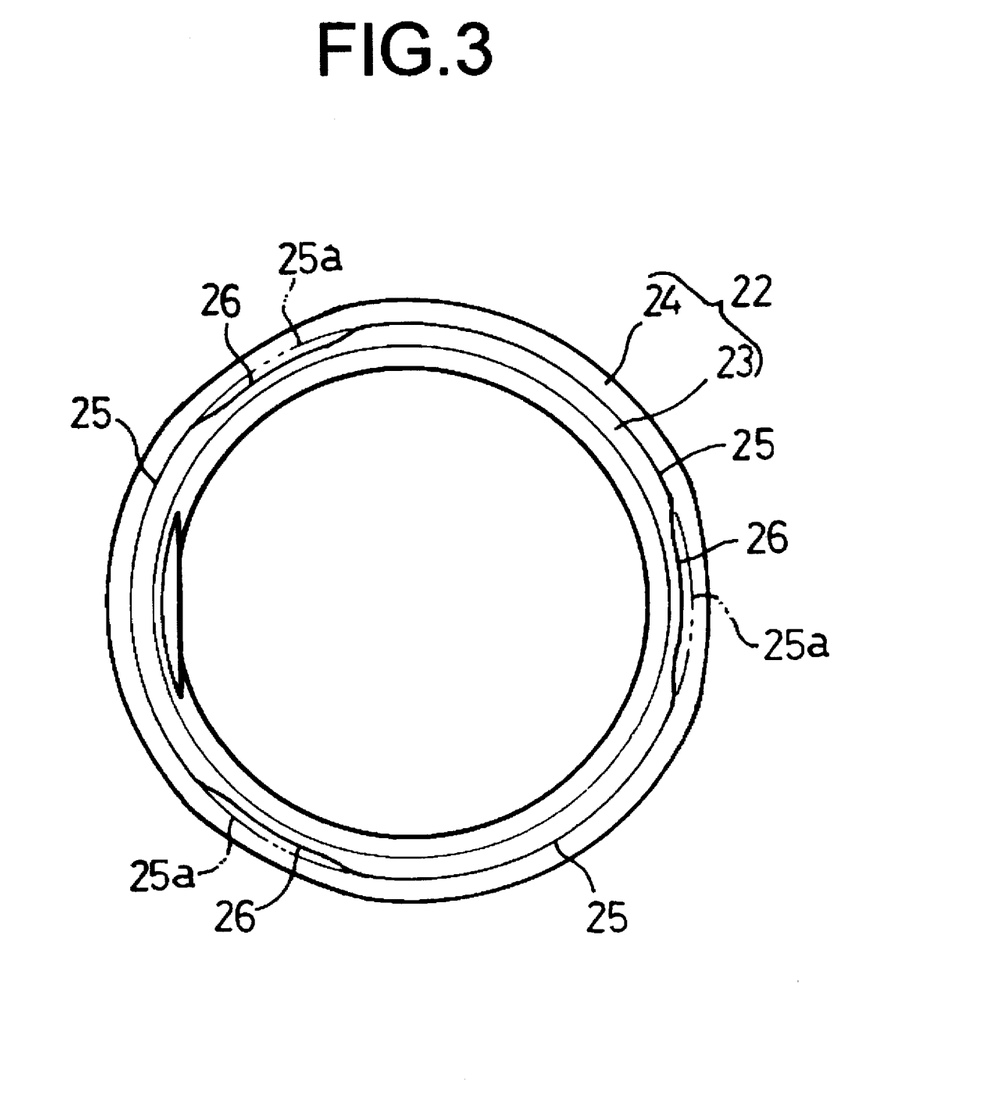
FIG. 3 is a view taken along an arrow 3 in FIG. 2.
Figure 4:
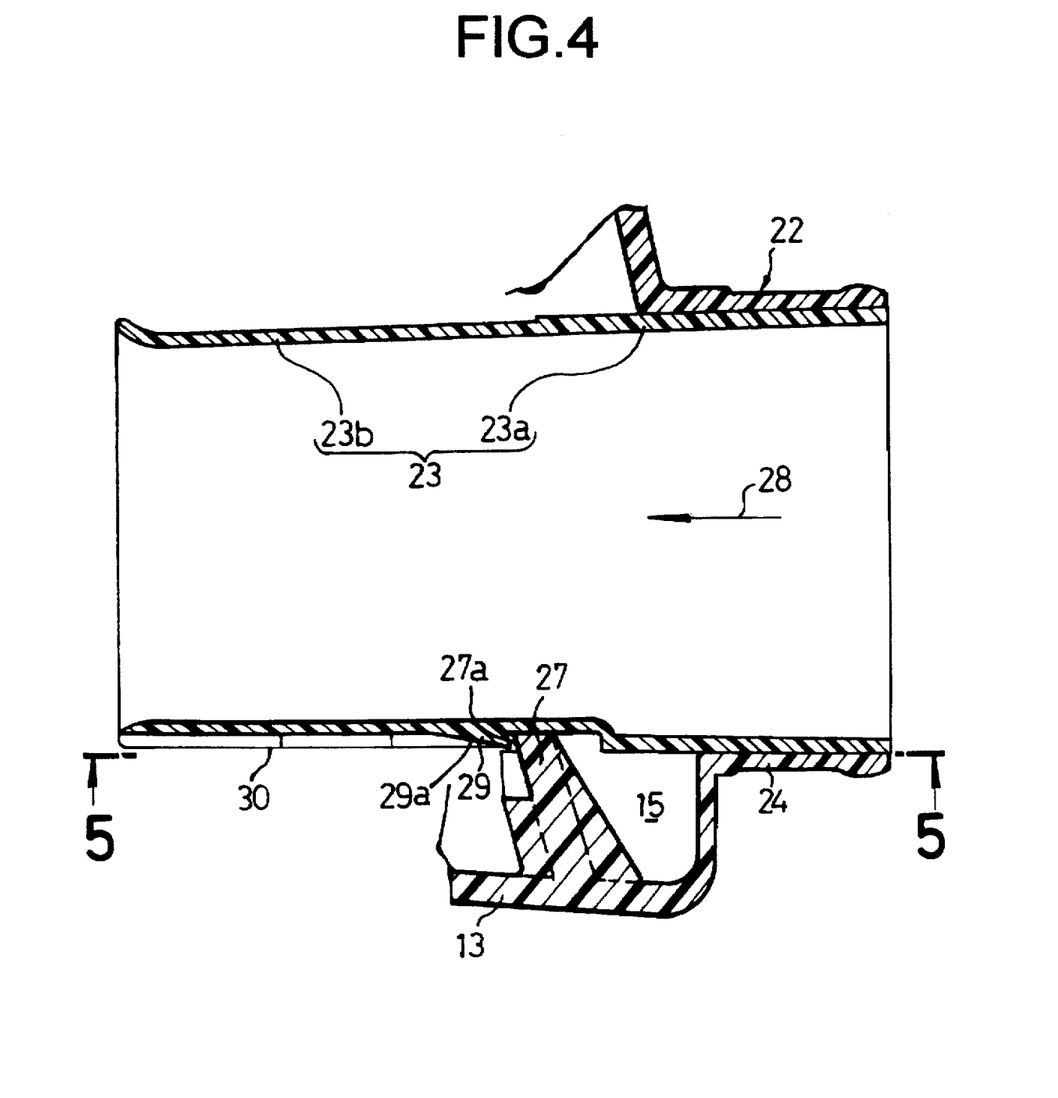
FIG. 4 is a sectional view taken along a line 4—4 in FIG. 2.
Figure 5:
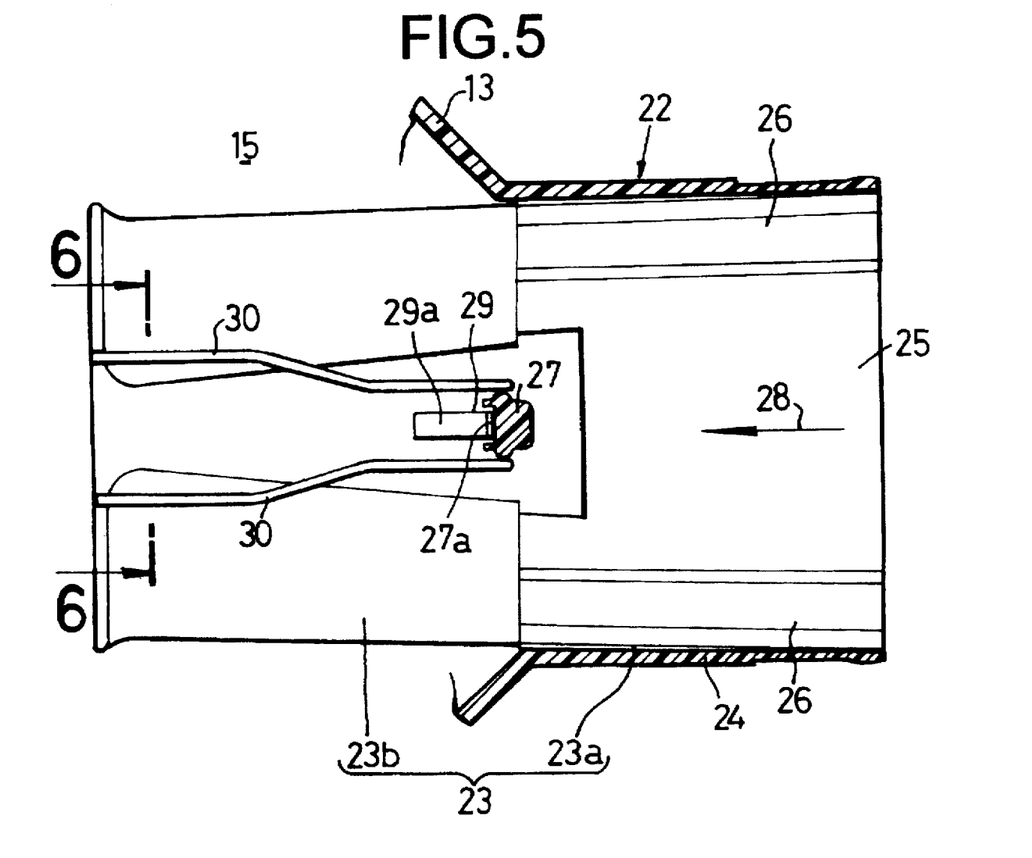
FIG. 5 is a sectional view taken along a line 5—5 in FIG. 4.

Referring also to FIGS. 3, 4 and 5, the exit pipe 22 is comprised of a first pipe 23, formed from the same material as the second case half 13, i.e., the reinforcing material-filled thermoplastic synthetic resin, and press-fitted into and coupled to a second pipe 24, which is integrally provided on the second case half 13, to protrude outwardly. The first pipe 23 is comprised of a press-fitted cylindrical portion 23a, FIG. 4, which has a length substantially corresponding to the axial length of the second pipe 24, and a protrusion-in cylindrical portion 23b which protrudes into the purified-air chamber 15 in the second case half 13. The press-fitted cylindrical portion 23a and the protrusion-in cylindrical portion 23b are integrally and coaxially connected to each other.

The press-fitted cylindrical portion 23a is formed into a cylindrical shape, having the substantially same thickness as the thickness of the second pipe 24 which is integral with the second case half 13. The outer peripheral surface of the press-fitted cylindrical portion 23a is constructed of arcuate portions 25 formed into an arcuate shape of the same radius about an axis of the first pipe 23 at a plurality of, e.g., three, circumferentially equally spaced-apart portions, and a plurality of, e.g., three recesses 26 located between the arcuate portions 25 at radially inner points than phantom extensions 25a (shown by dashed lines in FIG. 3) of the arcuate portions 25. Each of the recesses 26 is formed to extend axially over the substantially entire length of the press-fitted cylindrical portion 23a. The proportion of the total sum of circumferential lengths of all the recesses 26 occupying the entire recircumferential length of the outer peripheral surface of the press-fitted cylindrical portion 23a is set, for example, at about 30%.

The inner peripheral surface of the second pipe 24 is formed to have a circular cross section about an axis of the second pipe 24. The protrusion-in cylindrical portion 23b of the first pipe 23 is formed into a cylindrical shape having an outside diameter slightly smaller than the inside diameter of the second pipe 24. When the first pipe 23 is press-fitted into the second pipe 24, the protrusion-in cylindrical portion 23b is allowed to smoothly pass through the second pipe 24 and to protrude into the purifying chamber 15.

Because the protrusion-in cylindrical portion 23b protrudes into the chamber 15 in the above manner, a portion of the protrusion-in cylindrical portion 23b is surrounded by the second case half 13 within the chamber 15, and this provides the resonance effect, thereby making it possible to provide reductions in vibration of the air cleaner AC and in noise in the intake system particularly without provision of a resonance chamber.

A stopper 27, FIG. 4, is projectingly provided on an inner surface of the second case half 13 and has a stopper surface 27a formed thereon to face forwardly in the direction of movement of the first pipe 23 into the second pipe 24 indicated by arrow 28 of press-fitting of the first pipe 23 into the second pipe 24.

Figure 6:
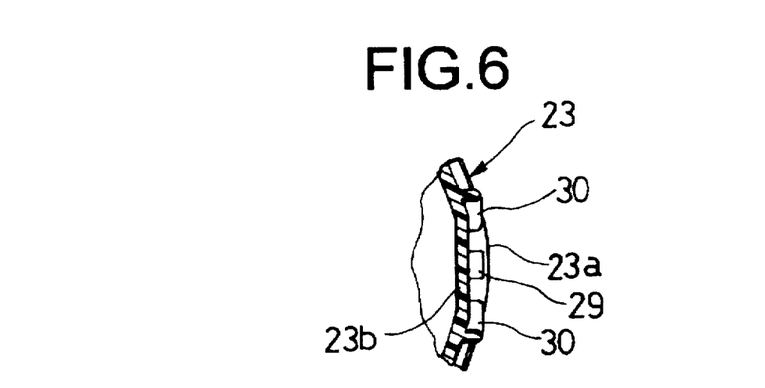
FIG. 6 is a sectional view taken along a line 6—6 in FIG. 5.

Referring also to FIG. 6, a locking portion 29 is projectingly provided on the outer surface of the protrusion-in cylindrical portion 23b of the first pipe 23 in opposition to the stopper surface 27a in a condition in which the first pipe 23 has been press-fitted and coupled into the second pipe 24. The locking portion 29 has an outer surface which is formed as an inclined guide surface 29a for permitting the locking portion 29 to pass the stopper 27, when the first pipe 23 is moved in the press-fitting direction into the second pipe 24. A pair of guide projections 30, 30 are also provided on the outer surface of the protrusion-in cylindrical portion 23b for guiding the alignment of the stopper 27 with respect to the locking portion 29, when the first pipe 23 is moved into the second pipe 24. The guide projections 30, 30 are provided on opposite sides of the locking portion 29 and extend from an inner end of the protrusion-in cylindrical portion 23b to a location adjacent to the locking portion 29. Moreover, the distance between the guide projections 30, 30 is set such that it is widest at the inner end of the protrusion-in cylindrical portion 23b and narrowest at the location adjacent to the locking portion 29.

The operation of this embodiment will be described below. The relationship between the press-fit margin and the elongation, provided when the first pipe 23 formed from the reinforcing material-fitted thermoplastic synthetic resin and having the plurality of recesses 26 on the outer peripheral surface is press-fitted into the second pipe formed from the reinforcing material-fitted thermoplastic synthetic resin is shown by line A which is a solid line in FIG. 7. The relationship between the press-fit margin and the elongation provided when a pipe formed from a reinforcing material-fitted thermoplastic synthetic resin and having no recesses is press-fitted is shown by a line B in FIG. 7, and the relationship between the press-fit margin and the elongation provided when a pipe formed from a mere thermoplastic synthetic resin and having no recesses is press-fitted is shown by a line C in FIG. 7. As is apparent from the lines B and C in FIG. 7, when the reinforcing material-fitted thermoplastic synthetic resin is used, the strength and the creep resistance are enhanced, as compared with the use of the thermoplastic synthetic resin containing no reinforcing material, but the elongation limit is decreased and, hence, the press-fit margin leading to the elongation limit is also decreased. As a result, the tolerance of the press-fit margin, not exceeding the elongation limit, is also decreased and thus, it is necessarily required to enhance the dimensional accuracy of a product.

Figure 7:
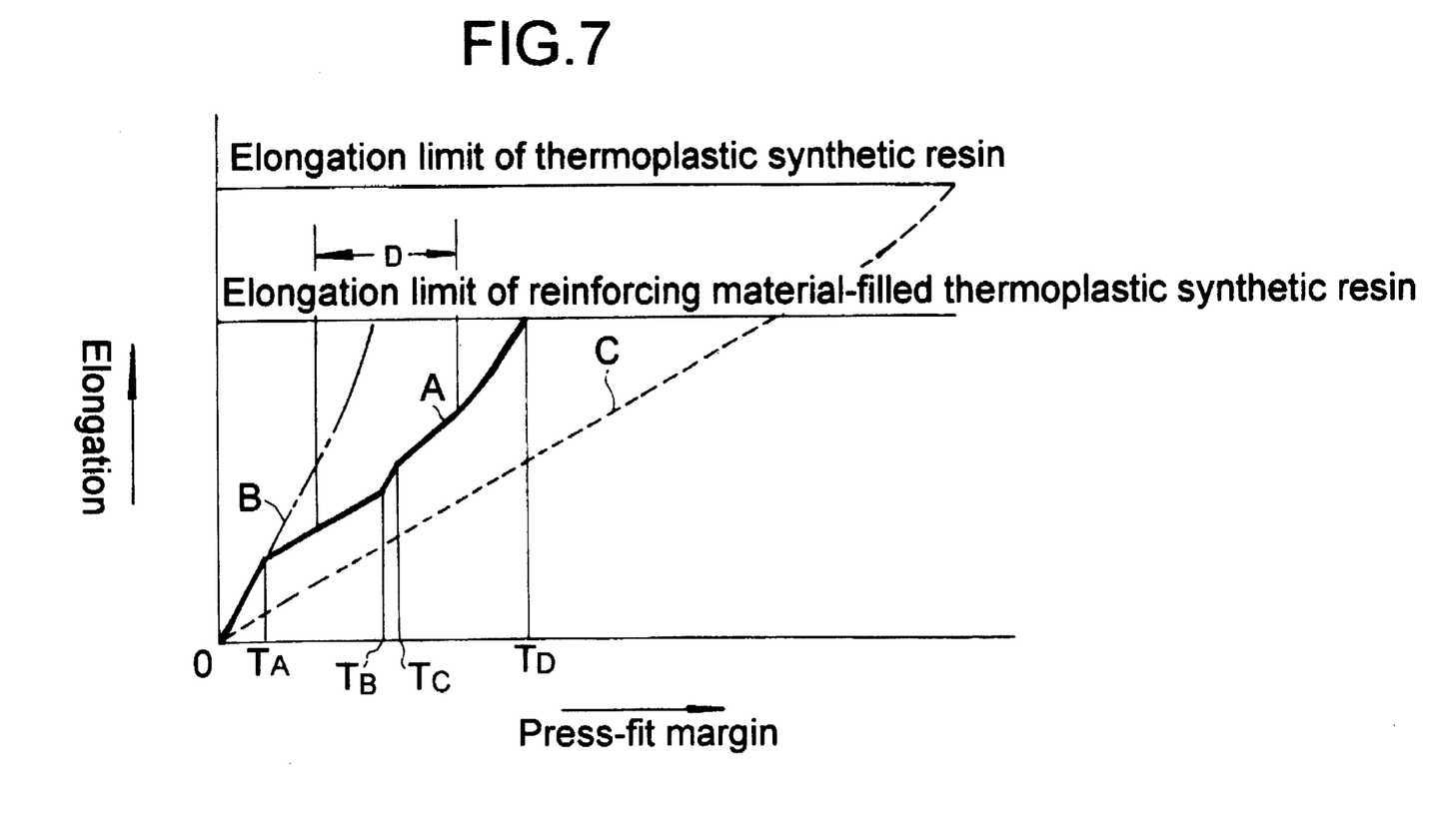
FIG. 7 is a graph illustrating the relationship between the press-fit margin and the elongation.

By contrast, if the plurality of recesses 26 are formed on the outer periphery of the first pipe 23, at circumferentially spaced-apart locations according to the present invention, the press-fit leading to the elongation limit can be relatively increased, thereby making it possible to reduce the dimensional accuracy of a product. The reason therefor will be described below.

First, in a range of a press-fit margin from "0" to "$T_A$", the line A indicates the elongation similar to that indicated by the line B resulting from the use of the reinforcing material-filled thermoplastic synthetic resin having no recesses.

Then, in a range of the press-fit margin from "$T_A$" to "$T_B$", a tensile force is applied to the second pipe 24 whereas a compressing force is applied to the first pipe 23. When the pipes 23 and 24 have the substantially same thickness, the tensile force is smaller than the compressing force and hence, the deformation of the second pipe 24 is first started. In this case, a gap is produced between the second and first pipes 24 and 23 by the recesses 26 in the outer peripheral surface of the first pipe 23, and stress is liable to be concentrated to the gap area and hence, the second pipe 24 flows so as to fill the recesses 26. For this reason, the variation in elongation indicated by the line A is gentle, as compared with the line B.

In a range of the press-fit margin from "$T_B$" to "$T_C$", the tensile force becomes equal to the compressing force by the completion of the flowing of the second pipe 24 at the press-fit margin "$T_B$", so that the first and second pipes 23 and 24 elongate substantially in unison with each other, and the lines A and B are varied in the same manner.

Further, when the press-fit margin is increased to exceed $T_c$, the tensile force becomes larger than the compressing force. Due to the fact that the thickness of the first pipe 23 at the plurality of recesses 26 is smaller than that at the other portions, i.e., at the arcuate portions 25, the stress is liable to be concentrated to the thinner portions at the recesses 26 to cause a compression deformation. For this reason, the variation in elongation indicated by the line A is gentle, as compared with the line B. Then at the press-fit margin "$T_D$", the second pipe 24 reaches the elongation limit.

In this way, as apparent from the comparisons of the lines A and B with each other, the provision of the plurality of recesses 26 on the outer peripheral surface of the first pipe 23 makes it possible to set the allowable press-fit margin setting range D upon the press-fitting of the first and second pipes 23 and 24 made of the reinforcing material-filled thermoplastic synthetic resin; to relatively reduce the dimensional accuracy of the product and moreover to provide the coupled state with a high coupling stability and without the need for an extra retaining/fixing member, such as a welding, a caulking, and the like, on the side of the outlet of the air cleaner AC requiring a vibration resistance, a wear resistance and a firm retainability.

Moreover, the purified-air exit pipe 22 connected to the second case half 13 of the case 11 in the air cleaner AC is comprised of the second pipe 24 integrally provided on the second case half 13, and the first pipe 23 press-fitted into and coupled with the second pipe 24, and the first pipe 23 is constructed by the integral interconnection of the press-fitted cylindrical portion 23a which is press-fitted into the second pipe 24, and the protrusion-in cylindrical portion 23b which protrudes into the chamber 15 in the second case half 13. Therefore, it is unnecessary to construct a complex mold in the production of the second case half 13 by the injection molding, and it is possible to provide the resonance effect by coupling the first and second pipes 23 and 24 to each other to insert the protrusion-in cylindrical portion 23b into the second case half 13, while maintaining the coupling structure with the high coupling stability, which does not require the extra retaining/fixing member, the welding, the caulking and the like, on the side of the outlet of the air cleaner AC which requires that a foreign matter, such as abrasion powder and noise, not be produced due to a vibration and a fluid pulsation, and which also requires a durability.

As a result of the protrusion of the first pipe 23 into the second pipe 24, the locking portion 29 projectingly provided on the outer surface of the protrusion-in cylindrical portion 23b of the fist pipe 23 is opposed to the stopper surface 27a formed on the stopper 27 provided on the inner surface of the second case half 13 to face inwardly of the second case half 13. Therefore, the first pipe 23, after being press-fitted into and coupled with the second pipe 24, is reliably prevented from being disengaged from the second pipe 24 due to a vibration or the like.

Although the embodiment of the present invention has been described in detail, it will be understood that the present invention is not limited to the above-described embodiment, and various modification in design may be made within the spirit and scope of the invention defined in claims.

For example, although the first and second pipes 23 and 24 have been described as being formed from the reinforcing material-filled thermoplastic synthetic resin in the above-described embodiment, the present invention is widely applicable to a coupling structure for a pair of pipes formed from a synthetic resin containing no reinforcing material added thereto. In addition, the present invention is applicable not only to the purifying air exit pipe 22 of the air cleaner AC for the internal combustion engine, but also widely applicable to a coupling structure for a pair of pipes made of a synthetic resin.

What is claimed is:

1. A synthetic resin pipe coupling structure for coupling a first pipe of synthetic resin to a second pipe of synthetic resin, wherein said first pipe is press-fitted into said second pipe having an inner peripheral surface which is circular in cross-section about an axis of said second pipe, said first pipe having an outer peripheral surface provided with recesses therein, said recesses being located on said outer peripheral surface with circumferential spacings therebetween, and wherein said first pipe comprises a cylindrical press-fitted portion provided with said recesses which have a predetermined length substantially corresponding to an axial length of said second pipe, said cylindrical press-fitted portion being press-fitted into said second pipe, said first pipe further comprising a cylindrical protrusion-in portion integrally extending from said press-fitted cylindrical portion, and wherein a stopper projection formed integral with said second pipe and having a stopper surface facing in a direction of movement between said pipes for press-fitting said first pipe into said second pipe, and a locking portion projectingly provided on an outer surface of the cylindrical protrusion-in portion of said first pipe, said locking portion being operative to engage said stopper surface of said stopper projection after said first pipe is press-fitted into said second pipe.

2. A synthetic resin pipe coupling structure according to claim 1, wherein said locking portion comprises an inclined guide surface which is tapered so as to make a diameter of said cylindrical outer surface of said protrusion-in portion increase gradually in a direction toward said cylindrical press-fitted portion.

3. A synthetic resin pipe coupling structure according to claim 1, wherein a pair of guide projections are provided on the outer surface of said cylindrical protrusion-in portion so as to be mutually spaced from each other and from said locking portion and to extend substantially parallel to the axis of said first pipe.

4. A synthetic resin pipe coupling structure according to claim 2, wherein a pair of guide projections are provided on the outer surface of said cylindrical protrusion-in portion so as to be mutually spaced from each other and from said locking portion and to extend substantially parallel to the axis of said first pipe.

5. A synthetic resin pipe coupling structure according to claim 1, for use with an air cleaner for an internal combustion engine, said first pipe being adapted for use as an exit pipe of the air cleaner and said second pipe being adapted for use with a case for said air cleaner, said cylindrical protrusion-in portion of the first pipe being of a length for protruding into said case of the air cleaner.

* * * * *